(12) United States Patent
Scott et al.

(10) Patent No.: US 10,093,264 B2
(45) Date of Patent: Oct. 9, 2018

(54) CAB MOUNT FOR A WORK VEHICLE

(71) Applicant: CNH Industrial America LLC, New Holland, PA (US)

(72) Inventors: Shane Michael Scott, Bolingbrook, IL (US); Mark Steven Draeger, Oak Creek, WI (US); Daniel Alan Morey, Mundelein, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/391,708

(22) Filed: Dec. 27, 2016

(65) Prior Publication Data

US 2018/0178746 A1 Jun. 28, 2018

(51) Int. Cl.
*B60R 21/13* (2006.01)
*B62D 33/06* (2006.01)
*B62D 21/15* (2006.01)
*B60R 21/00* (2006.01)

(52) U.S. Cl.
CPC ............ *B60R 21/131* (2013.01); *B62D 21/15* (2013.01); *B62D 33/0617* (2013.01); *B60R 2021/0018* (2013.01); *B60R 2021/0076* (2013.01); *B60R 2021/0081* (2013.01); *B60Y 2200/221* (2013.01); *B60Y 2200/222* (2013.01); *B60Y 2306/01* (2013.01)

(58) Field of Classification Search
CPC .......... B60R 21/131; B60R 2021/0081; B60R 2021/0018; B60R 2021/0076; B62D 21/15; B62D 33/0617; B60Y 2306/01; B60Y 2200/222; B60Y 2200/221

USPC ............ 296/190.07, 190.01, 190.04, 190.06, 296/190.08, 1.03, 35.2, 187.13, 35.1
See application file for complete search history.

(56) References Cited

U.S. PATENT DOCUMENTS

| | | | |
|---|---|---|---|
| 3,652,074 A | 3/1972 | Frederickson et al. | |
| 3,856,324 A | 12/1974 | Saitoh | |
| 3,881,767 A | 5/1975 | Klees | |
| 4,032,187 A * | 6/1977 | Atherton | B60R 21/131 |
| | | | 280/756 |
| 5,915,775 A | 6/1999 | Martin et al. | |
| 5,984,036 A * | 11/1999 | Higuchi | E02F 9/166 |
| | | | 180/89.12 |
| 6,073,405 A | 6/2000 | Kasai et al. | |
| 6,648,385 B2 | 11/2003 | Frank | |
| 7,406,849 B2 | 8/2008 | Ueno et al. | |

(Continued)

FOREIGN PATENT DOCUMENTS

WO 2011025784 3/2011

*Primary Examiner* — Jason S Morrow
*Assistant Examiner* — E Turner Hicks
(74) *Attorney, Agent, or Firm* — Rickard K. DeMille; Rebecca L. Henkel (57) ABSTRACT

A work vehicle includes an operator cabin, a transmission-supporting frame, and a mounting assembly. The mounting assembly includes a first mount configured to couple to the operator cabin, and a second mount configured to couple to the transmission-supporting frame. The first mount includes a first plate, and the second mount includes a second plate. The first plate and the second plate are coupled to one another at an interface, and at least one of the first plate and the second plate are configured to deform proximate to the interface to separate from one another when under tension during a roll-over event.

18 Claims, 5 Drawing Sheets

(56) References Cited

U.S. PATENT DOCUMENTS

| | | | |
|---|---|---|---|
| 7,441,809 B1 | 10/2008 | Coombs et al. | |
| 8,517,457 B2 | 8/2013 | Yamamoto et al. | |
| 8,657,251 B2* | 2/2014 | Kamimae | E02F 9/166 |
| | | | 180/89.12 |
| 8,820,805 B2 | 9/2014 | Lee et al. | |
| 9,329,000 B1 | 5/2016 | Richmond et al. | |
| 2005/0116435 A1 | 6/2005 | Nishiura et al. | |
| 2006/0027797 A1* | 2/2006 | Sicking | E01F 15/0461 |
| | | | 256/13.1 |
| 2006/0071499 A1* | 4/2006 | Yoon | B62D 33/0604 |
| | | | 296/35.1 |
| 2010/0176624 A1* | 7/2010 | Kamimae | E02F 9/166 |
| | | | 296/190.08 |
| 2015/0123390 A1* | 5/2015 | Scott | B60R 21/13 |
| | | | 280/756 |

\* cited by examiner

CAB MOUNT FOR A WORK VEHICLE

BACKGROUND

The disclosure relates generally to a cab mount for a work vehicle.

Generally, work vehicles (e.g., tractors, harvesters, skid steers, etc.) may include a cab configured to house an operator. Work vehicles may also include elements configured to couple the cab to a chassis (e.g., frame) of the work vehicle. Due to limited deformation of such elements during a roll-over event, the energy (e.g., associated with the cab of the work vehicle striking the ground) may be transmitted to the cab, thereby negatively affecting the integrity of the cab during the roll-over event, for example.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a cab mounting assembly is configured to be positioned between an operator cabin of a work vehicle and a frame of the work vehicle. The cab mounting includes a first mount configured to couple to the operator cabin of the work vehicle, and a second mount configured to couple to the frame. The first mount includes a first plate having a first vertically-facing surface, and the second mount includes a second plate configured to be coupled to the first plate and having a second vertically-facing surface. The first vertically-facing surface is configured to contact the second vertically facing surface when the first plate and the second plate are coupled to one another. Furthermore, a portion of the first vertically-facing surface is configured to separate from the second vertically-facing surface to absorb energy during a roll-over event.

In a second embodiment, a cab mounting assembly for a work vehicle includes a first mount configured to couple to an operator cabin of the work vehicle, and a second mount configured to couple to a frame of the work vehicle and to the first mount. The first mount includes a first vertically-facing surface and the second mount includes a second vertically-facing surface. The first vertically-facing surface is configured to contact the second vertically-facing surface at an interface when the first mount and the second mount are coupled to one another. Furthermore, at least one of the first mount and the second mount are configured to deform proximate to the interface when under tension during a roll-over event.

In a third embodiment, a work vehicle includes an operator cabin, a transmission-supporting frame, and a mounting assembly. The mounting assembly includes a first mount configured to couple to the operator cabin, and a second mount configured to couple to the transmission-supporting frame. The first mount includes a first plate, and the second mount includes a second plate. The first plate and the second plate are coupled to one another at an interface, and at least one of the first plate and the second plate are configured to deform proximate to the interface to separate from one another when under tension during a roll-over event.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to cab mounts for off-road vehicles (e.g., construction vehicles, utility vehicles, agricultural vehicles, work vehicles). The disclosed cab mounts are configured to be generally located between a cab and a chassis (e.g., vehicle frame) and on opposite lateral sides of the work vehicle. Each cab mount includes a top portion and a bottom portion that are at least partially coupled together. The cab mount is configured to absorb energy when in tension so that the top portion and/or the bottom portion may deflect (e.g., yield) some amount during an event (e.g., a roll-over), thereby limiting the deformation of the cabin of the work vehicle, for example. Furthermore, the cab mount is designed to not yield when experiencing compressive forces, thereby enabling the cab mount to support the chassis and components mounted to the chassis when the work vehicle is in an inverted (e.g., upside-down) position, as may happen during a roll-over, for example.

Figure 1:
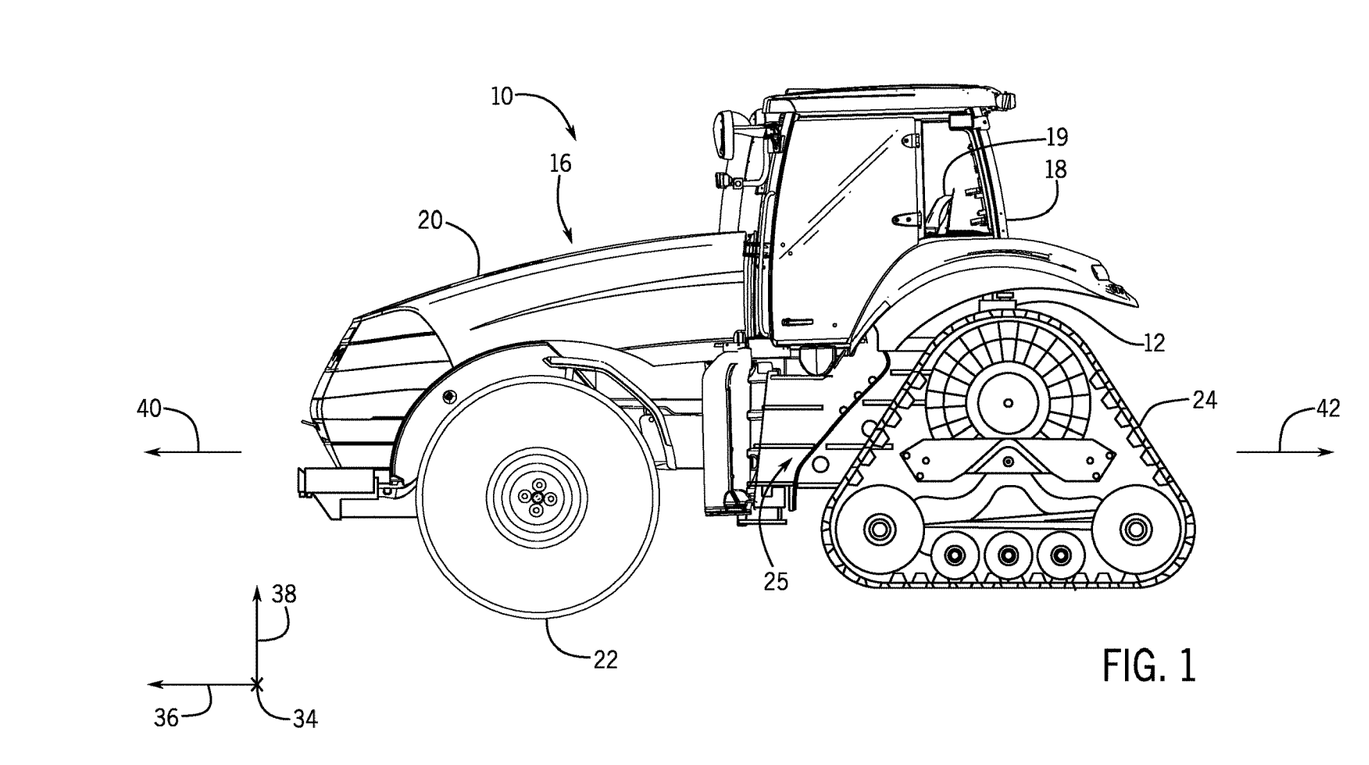
FIG. 1 is a side view of an embodiment of a work vehicle that may include a cab mount.

With the foregoing in mind, FIG. 1 is a side view of an embodiment of an off-road vehicle 10 having a cab mount 12 (e.g., a cabin mount assembly). In the illustrated embodiment, the vehicle 10 includes a body 16 and a cabin 18 in which an operator may sit in a seat 19 to operate the vehicle 10. The body 16 includes a frame 25 (e.g., chassis) that may support an internal combustion engine, a transmission, and/or a powertrain configured to drive one or more wheels 22 and/or tracks 24 configured to carry the work vehicle 10 across a field. The body 16 may also include a hood 20 that covers elements of the work vehicle 10, such as the engine, the transmission, the powertrain, etc. As illustrated, the cab mount 12 may be generally located between the cab 18 and a frame 25. The cab mount 12 may also be located on the interior of the work vehicle 10 (e.g., laterally between the one or more tracks 24). The cab mounts 12 may be configured to absorb energy in the sides and rear of the work vehicle 10 during an event, such as a roll-over.

The vehicle 10 and/or the cab mount 12 may be described with reference to a lateral axis or direction 34, a longitudinal axis or direction 36, and a vertical axis or direction 38. Additionally, the vehicle 10 may travel in a forward direction 40 (e.g., a forward direction of travel) or a rearward direction 42 (e.g., a rearward direction of travel). In the illustrated embodiment, the vehicle 10 is an agricultural tractor. However, any suitable agricultural or off-road vehicle, including self-propelled vehicles, sprayers, combines, trucks, and so forth may utilize aspects of the disclosed embodiments. It should be understood that in some vehicles, the wheels 22 and/or the tracks 24 may be replaced with other drive systems. It should be noted, that when describing embodiments of the cab mount 12 and various elements herein, the same elements may be mirrored on the laterally opposite side of the work vehicle 10 in the.

Figure 2:
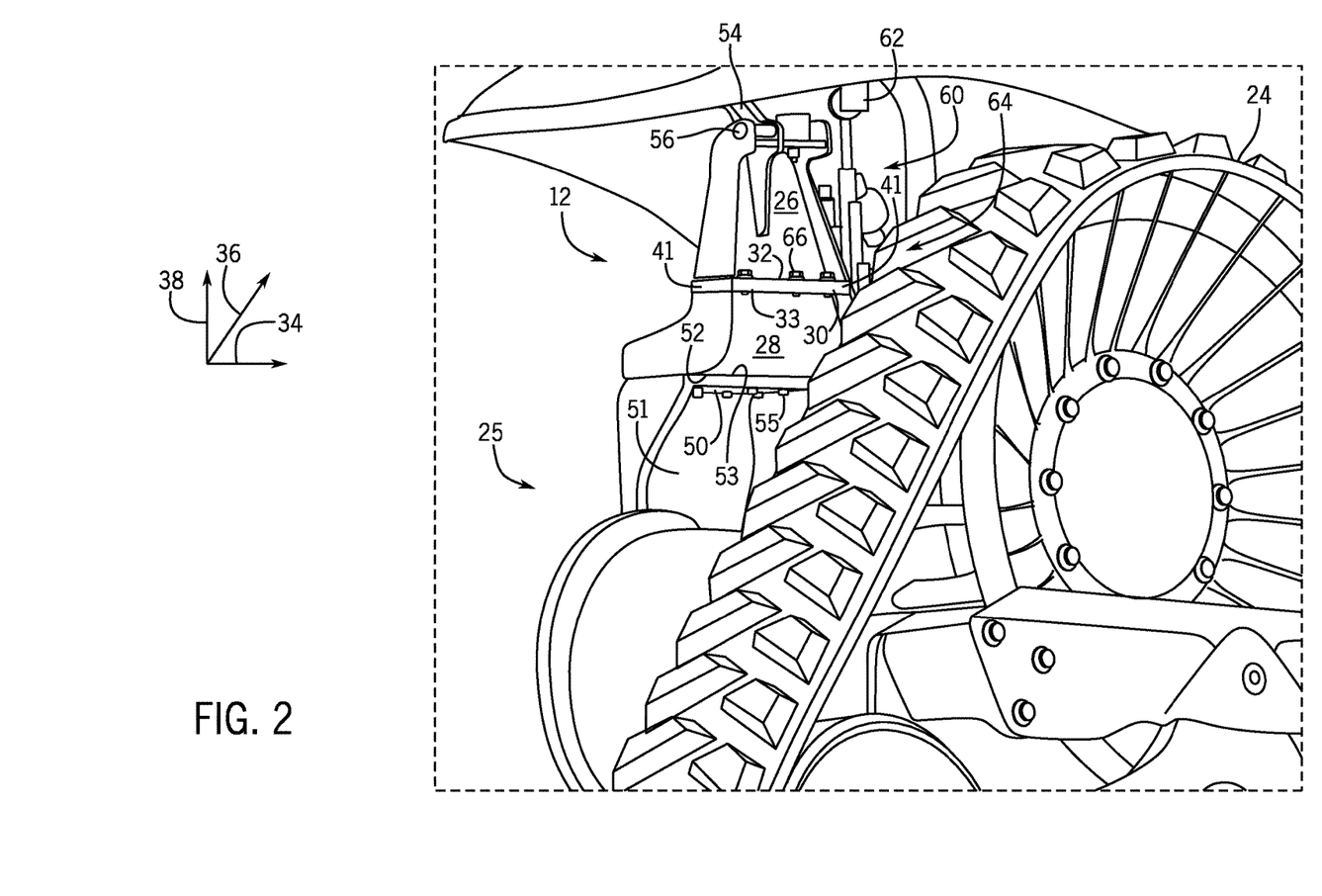
FIG. 2 is a perspective view of an embodiment of a cab mount that may be utilized within the work vehicle of FIG. 1.

FIG. 2 is a perspective view of an embodiment of the cab mount 12 within the work vehicle 10. As shown, the cab mount 12 includes a top portion 26 (e.g., first mount, first frame, first portion, upper portion) and a bottom portion 28 (e.g., second mount, second frame, second portion, bottom portion). The top and bottom portions 26, 28 are coupled together at a joint 30 (e.g., interface). As shown, a first plate 32 (e.g., first vertically-facing plate, upper plate, top plate) of the top portion 26 and a second plate 33 (e.g., second vertically-facing plate, lower plate, bottom plate) of the bottom portion 28 are coupled to one another via fasteners 66 (e.g., threaded fasteners, such as bolts). The first and second plates 32, 33 may additionally or alternatively be coupled via welding, for example. The first plate 32 and/or the second plate 33 may be configured to yield under tension to absorb at least some energy. The yielding may occur through deflection of longitudinal edges 41 (e.g., forward edge and/or rearward edge) of the plates 32, 33. For example, when yielding occurs, one or more longitudinal edges 41 of the top plate 32 may deflect (e.g., bend) some distance away from the longitudinal edges 41 of the bottom plate 33. At the same time, or in the alternative, when yielding occurs, one or more longitudinal edges 41 of the bottom plate 33 may deflect (e.g., bend) some distance away from the longitudinal edges 41 of the top plate 32. Thus, at least some portion of a vertically-facing surface of the top plate 32 may separate from an opposed vertically-facing surface of the bottom plate 33 under tension (e.g., due to the cabin 18 striking the ground during a roll-over event).

Figure 3:
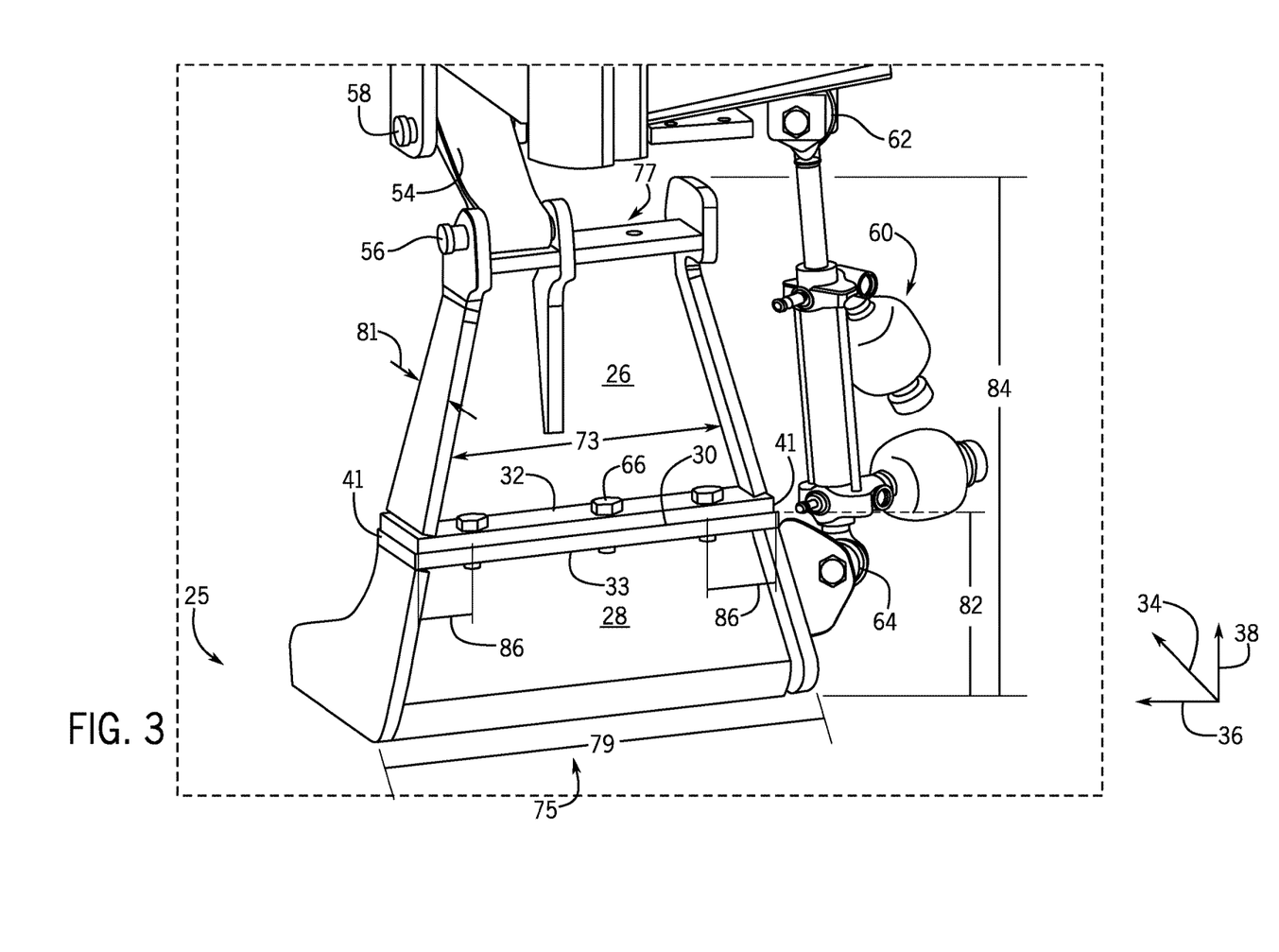
FIG. 3 is a perspective view of an embodiment of the cab mount of FIG. 2.

As shown, the cab mount 12 is coupled to the frame 25 via a flange 50 of the frame 25. More specifically, a flat portion 52 of the bottom portion 28 of the cab mount 12 may include a flat surface 51 (e.g., vertically-facing surface or bottom surface) that is supported by and/or in direct contact with a flat surface 53 (e.g., vertically-facing surface) of the flange 50. The cab mount 12 and the flange 50 may be coupled to one another, such as via fasteners 55 (e.g., threaded fasteners, such as bolts) and/or welding. As shown, the cab mount 12 is coupled to the cabin 18 via a strap 54 (e.g., belt, band, or tie down) that is coupled on one end to the cab mount 12 via a mount pin 56. With reference to FIG. 3, the strap 54 may also be coupled at a different and opposite end to the cabin 18 via a cabin pin 58. The strap 54 is configured to rotate about the pins 56, 58, which enables the cabin 18 to move relative to the cab mount 12. Additionally or alternatively, the cab mount 12 may be coupled to the cab 18 via a suspension assembly 60. The suspension assembly 60 may be coupled to the cabin 18 via a fastener 62 (e.g., an upper clevis joint) and to the cab mount 12 via a fastener 64 (e.g., lower clevis joint). In the depicted embodiment, the fastener 64 is coupled to the cab mount 12 on the bottom portion 28. However, in some embodiments, the fastener 64 is coupled to the cab mount 12 on the top portion 26. The suspension system 60 may be configured to provide dampening (e.g., energy absorption), while enabling the cabin 18 to move relative to the cab mount 12 and the frame 25 (e.g., along the vertical axis 38).

As is illustrated in FIG. 2, the cab mount 12 may be positioned laterally 34 inward of the tracks 24 (e.g., between laterally opposed tracks 24). The cab mount 12 may also be located vertically 38 between the cab 18 and the frame 25 (e.g., the flange 50 of the frame 25). The cab mount 12 may also be positioned vertically 38 below and/or rearward of the operator's seat 19 with respect to the forward direction 40. In some embodiments, the cab mount 12 may have a portion extending vertically 38 above a base (e.g., a bottom-most edge) of the cabin frame 18. Similarly, the cab mount 12 may have a portion extending vertically 38 below a top surface of the frame 25.

FIG. 3 is a perspective view of an embodiment of the cab mount 12 within the work vehicle 10. As described above, the cab mount 12 includes the top portion 26 and the bottom portion 28. The first and second portions 26, 28 are coupled via the joint 30 between the first plate 32 and the second plate 33. The joint 30 may include fasteners 66. In the depicted embodiment, three bolts 66 couple the first and second plate 32, 33 to one another. However, there may be any suitable number of fasteners 66 (e.g., equal to or greater than 1, 2, 3, 4, 5, 6 or more). Additionally or alternatively, the plates 32, 34 may be coupled to one another via welding.

In the depicted embodiment, the cab mount 12 is generally tapered in the longitudinal direction 36 along the vertical axis 38 (e.g., a length 73 of the cab mount 12 may decrease from a bottom end 75 to a top end 77 of the cab mount 12). For example, in the depicted embodiment, a top length 80 (e.g., at the top end 77) is less than a base length 79 (e.g., at the bottom end 75 and/or of the flat surface 51), such as equal to or less than approximately 10, 20, 30, 40, 50, 60, 70, or 80 percent of the base length 79. However, in other embodiments the direction of the taper may be reversed and the base length 79 may be less than the top length 80. Furthermore, the cab mount 12 may be tapered in the lateral direction 34 along the vertical axis 38 (e.g., a width 81 of the cab mount 12 may decrease from the bottom end 75 to the top end 77 of the cab mount 12). For example, the flat portion 52 at the bottom end 75 of the cab mount 12 may be the widest portion of the cab mount 12. However, in some embodiments, the direction of the taper may be reversed. In some embodiments, the length 73 and/or the width 81 may be substantially constant across some or all of the cab mount 12, for example. The illustrated configuration may enable the cab mount 12 to act as a cantilever when experiencing tensile forces.

As shown, the joint 30 is located at a first height 82 (e.g., along the vertical axis 38) above the bottom end 75 and/or the flat surface 52 of the cab mount 12. The first height 82 may be a percentage of a total height 84 (e.g., along the vertical axis 38) of the cab mount 12. For example, the first height 82 may be equal to or greater than approximately 30, 40, 50, 60, 70, and/or between approximately 45-55, 40-60, or 35-65 percent of the total height 84, for example. The amount of energy that may be absorbed by the cab mount 12 may depend on the location of the joint 30 in relation to the vertical direction 38. For example, if the first height 82 of the joint 30 is lower (e.g., toward a longer side of the taper of the cab mount 12, such as the bottom end 75 in the illustrated embodiment), then the cab mount 12 may absorb a relatively high amount of energy when experiencing tensile forces. Similarly, if the first height 82 of the joint 30 is higher (e.g., toward a thinner shorter side of the taper of the cab mount 12, such as the top end 77 in the illustrated embodiment) then the cab mount 12 may absorb relatively less energy when experiencing tensile forces.

The amount of energy that may be absorbed may also depend on an outer gap 86 (e.g., a distance between an outer-most connection, such as the outer-most fasteners 66, between the plates 32, 33 and the longitudinal edges 41 of the plates 32, 33). As the outer gap 86 increases, the cab mount 12 may absorb more energy when experiencing tensile forces.

The tensile forces described above may be a result of an event, such as the work vehicle 10 experiencing a roll-over. When the work vehicle 10 experiences a roll-over, the cabin 18 may strike the ground and the strap 54 pulls on the cab mount 12, thereby putting the cab mount 12 in tension. When the cab mount 12 is in tension, portions of the plates 32, 33 (e.g., at the longitudinal edges 41 and/or at the outer gap 86) may yield. As described in further detail below, this yielding may result in the plates 32, 33 bending away from one another. Furthermore, in some roll-over events, the work vehicle 10 may reach a stopped or resting position in which the cabin 18 is touching the ground, and the wheels 22, tracks 24, and frame 25 are above the cabin 18 in the vertical direction 38 (e.g., the work vehicle 10 is inverted or upside-down). In these instances, the work vehicle 10 may exert a compressive force (e.g., in the vertical direction) on the cab mount 12. However, due at least in part to the geometry, coupling components (e.g., fasteners, surfaces, or the like), and/or positioning within the work vehicle 10, the cab mount 12 may not yield when experiencing the compressive force that results from the weight of a lower portion of the work vehicle 10 resting on the cabin 18 and cab mount 12.

Figure 4:
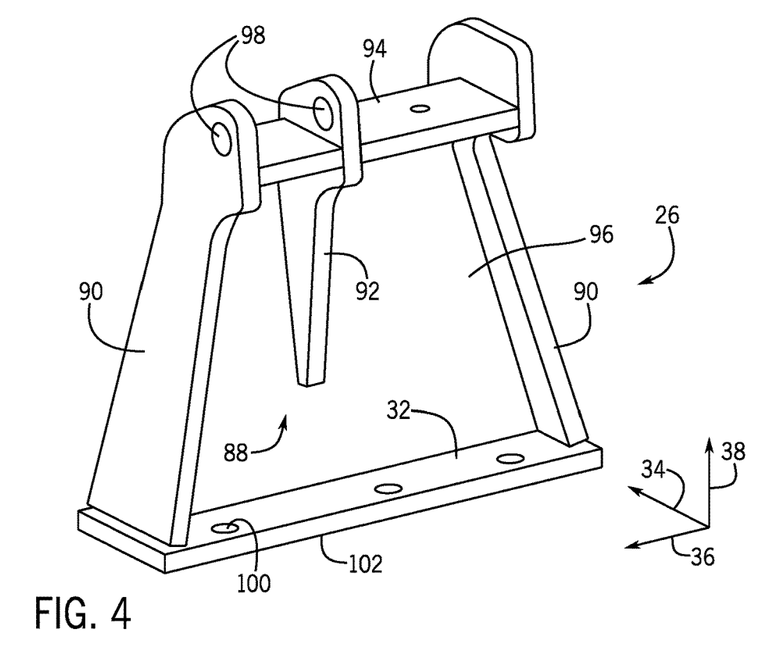
FIG. 4 is a perspective view of an embodiment of a top portion of the cab mount of FIG. 2.

FIG. 4 is a perspective view of an embodiment of a first side 88 (e.g., a laterally-outer side) of the top portion 26 of the cab mount 12. The top portion 26 may include outer walls 90 (e.g., tapered walls that converge toward one another along the vertical axis 38), a rib 92 (e.g., pin support), a top plate 94 (e.g., vertically-facing plate), and an inner wall 96. A top portion of one of the outer walls 90 and of the rib 92 may be configured to receive the mount pin 56 via strap mount holes 98. The outer walls 90 encase (e.g., bound) the inner wall 96 in the longitudinal direction 36, and the top plate 94 and the first plate 32 encase (e.g., bound) the inner wall 96 in the vertical direction 38. As shown, the outer walls 90 are generally laterally 34 and longitudinally 36 tapered in the vertical direction 38 from the first plate 32 to the top plate 94, and the inner wall 96 is longitudinally 36 tapered in the vertical direction 38 from the first plate 32 to the top plate 94. The rib 92 may taper in the opposite direction of the inner wall 96 and/or the outer walls 90. Further, the rib 92 may also extend only a portion of the inner wall 96 and outer walls 90 in the vertical direction 38 and/or portions of the outer walls 90 and rib 92 may extend vertically above the top plate 94. The first plate 32 may be integrally formed with or may be coupled to bottom edges of the outer walls 90, such as via welding. The first plate 32 may contain first plate connecting holes 100 configured to facilitate connection between the first plate 32 and the second plate 33. The first plate 32 may be connected to the second plate 33 via the fastener 66 through the first plate connecting holes 100, welding (e.g., plug welding) through the first plate connecting holes 100, welding a first vertically facing surface 102 of the first plate 32 of the top portion 26 to an opposed vertically-facing surface of the second plate 33 of the bottom portion 28, or any combination thereof. In the depicted embodiment, there are six first plate connecting holes 100 (e.g., three on each lateral side of the inner wall 96) to facilitate coupling the first plate 32 to the second plate 33. However, in some embodiments there may be approximately 2, 4, 8, 10, 12 or more first plate connecting holes 100. In the current embodiment, the connecting holes 100 are formed to fit an M16 sized fastener 66 (e.g., having an outer diameter of approximately 16 millimeters), but it is understood that the dimensions of the connecting holes 100 may vary. It is also understood that space between the holes 100 may vary.

Figure 5:
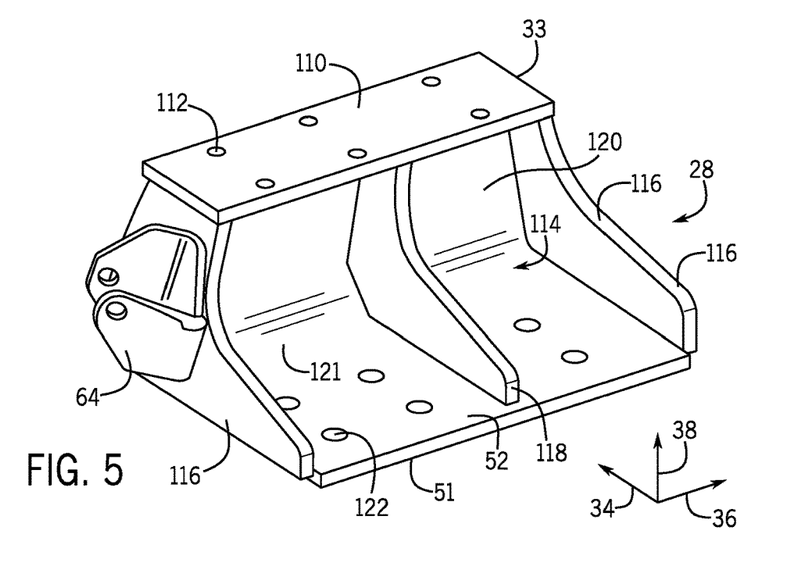
FIG. 5 is a perspective view of an embodiment of a bottom portion of the cab mount of FIG. 2.

FIG. 5 is a perspective view of an embodiment of a second side 114 (e.g., laterally-inner side) the bottom portion 28 of the cab mount 12. The bottom portion 28 of the cab mount 12 may include lower outer walls 116 (e.g., tapered outer walls, curved or bent or L-shaped outer walls), a lower rib 118 (e.g., intermediate support), the second plate 33, the flat portion 52 having the flat surfaces 51, and a vertical extension 120 (e.g., wall). The lower outer walls 116 may encase (e.g., bound) the flat portion 52 and the vertical extension 120 in the longitudinal direction 36. The flat portion 52 and the vertical extension 120 may form and/or be coupled to one another at a bend 121 (e.g., laterally-inward bend or curve). The lower rib 118 may be curved or bend to extend along both the flat portion 52 and the vertical extension 120. The second plate 33 may be integrally formed with or coupled on top of the lower rib 118 and the outer walls 116 in the vertical direction 38. In some embodiments, the second plate 33 may be coupled to the outer walls 116, the lower rib 118, and the vertical extension 120 via welding, for example. Furthermore, as described above, the flat portion 52 may be configured to couple to the frame 25 via the flange 50, such as via welding, fasteners 55, or any combination thereof. Accordingly, the flat portion 52 may include holes 122, which may be used to couple the bottom portion 28 to the frame 25. Further, the bottom portion 28 may couple to the suspension assembly 60 via the fastener 64.

Figure 6:
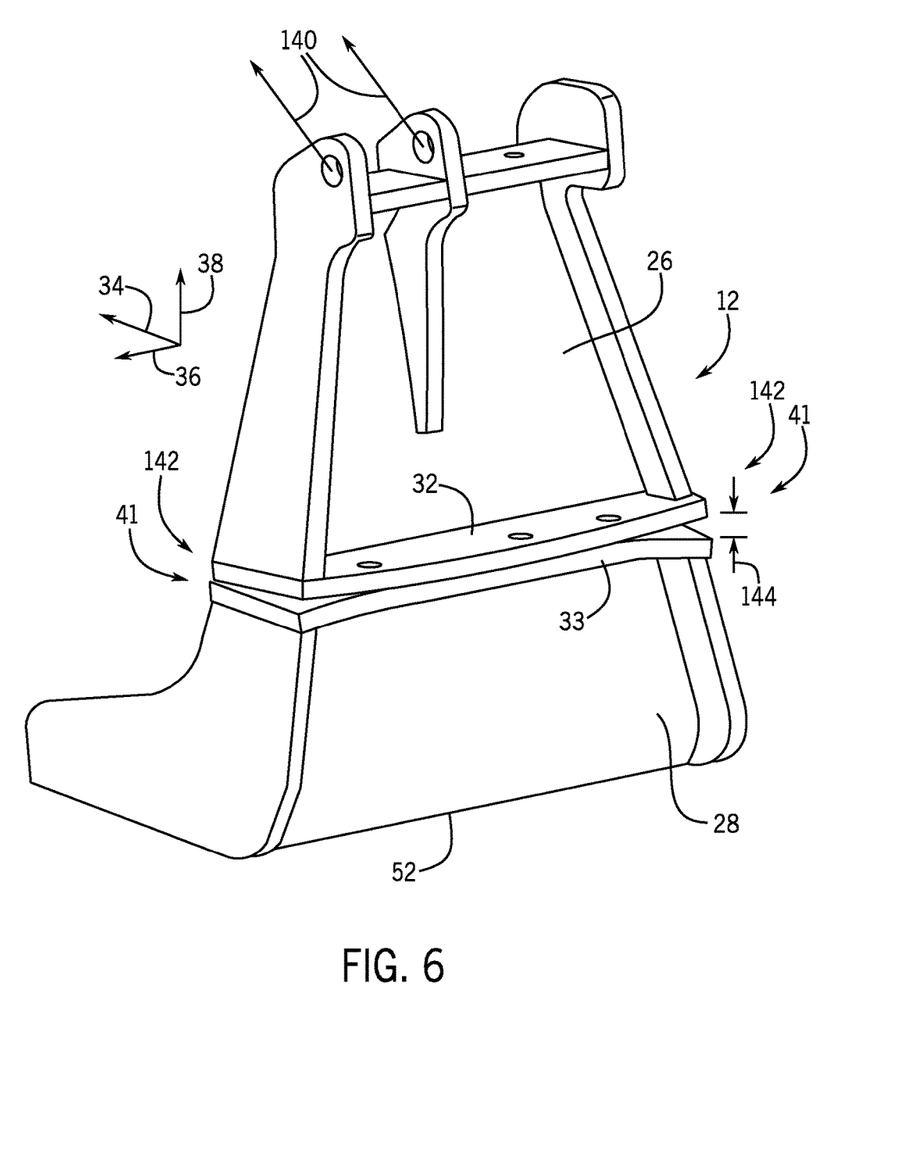
FIG. 6 is a perspective view of an embodiment of the cab mount of FIG. 2 under tension.

FIG. 6 is a perspective view of an embodiment of the cab mount 12 in tension. As described above, the cab mount 12 may experience a tensional force 140 during a roll-over (e.g., due to the cab 18 falling toward and/or striking the ground). The tensional force 140 may be in the vertical direction 38, the lateral direction 34, or any combination thereof. More specifically, during a roll-over, the cabin 18 may strike the ground and pull on the strap 54. As a result, the strap 54 may pull on the cab mount 12 with the tensional force 140. When the cab mount 12 is in tension as a result of the force 140, the first plate 32 and/or the second plate 33 may deform some amount, as is shown in FIG. 6. More specifically, the cab mount 12 may deform in energy absorbing regions 142 which may be generally along the longitudinal edges 41. When the cab mount 12 absorbs energy from the roll-over, the first plate 32 and/or the second plate 33 may yield and form a gap 144 (e.g., along the vertical axis 38) between each other in the energy absorbing regions 142.

The gap 144 may be formed as a result of plastic yielding. At the same time, or in the alternative, the gap 144 may be formed as a result of elastic yielding. Further, in some embodiments, one of the energy absorbing regions 142 may deform more than the other energy absorbing region 142 (e.g., the gap 144 may be larger on one longitudinal edge 41 than on the other). In some embodiments, the energy absorbing regions 142 may deform the same amount (e.g., the gap 144 may be substantially the same on both longitudinal edges of the cab mount 12). Further still, in some embodiments, the first plate 32 may deform more than the second plate 33. At the same time, or in the alternative, the first plate 32 may deform less than the second plate 33. For example, in some embodiments, the first plate 32 may deform, while the second plate 33 does not yield or deform. Similarly, in some embodiments, the first plate 32 may not yield or deform, while the second plate 33 yields or deforms. In some embodiments, the first plate 32 may yield more in one of the energy absorbing regions 142 than the other. Similarly, the second plate 33 may yield more in one of the energy absorbing regions 142 than the other energy absorbing region 142. Furthermore, the first plate 32 and/or the second plate 33 may also deform more on the first side 88 than on the second side 114 with respect to the lateral direction 34. Additionally, or in the alternative, the first plate 32 and/or the second plate 33 may deform less on the first side 88 than on the second side 114 with respect to the lateral direction 34.

Certain factors may be controlled to affect the degree of yielding/deformation and the performance of the cab mount 12. For example, the material used in the cab mount 12 may have a certain yield strength. The yield strength of the material may determine how much the cab mount 12 deforms and block tearing and/or cracking. In some embodiments, the yield strength of the material of the cab mount 12 may be equal to or greater than approximately 50 kilopounds per square inch [ksi] (i.e., 0.345 MegaPascals [MPa]). In some embodiments, the material may have a yield strength equal to or greater than approximately 40 ksi (i.e., 0.276 MPa) or 60 ksi (i.e., 0.414 MPa). In some embodiments, the material may have a yield strength between approximately 40 ksi (i.e., 0.276 MPa) and 60 ksi (i.e., 0.414 MPa). In some embodiments, the cabin mount 12 material may be a high-strength, low alloy-steel. As explained above, the outer gap 86 may be measured from the outer-most connections of the joint 30 to the longitudinal edge 41 of the first and second plates 32, 33. For example, the longer the outer 86 is, the more deformation/yielding the cab mount 12 may experience. Similarly, the shorter the outer gap 86 is, the less deformation/yielding the cab mount 12 may experience. Yet another factor that may affect the degree of yielding is the height 82 of the joint 30. As described above, if the joint 30 is toward a thicker portion of the cab mount 12, then the cab mount 12 may absorb more energy when experiencing the tension force 140.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A cab mounting assembly configured to be positioned between an operator cabin of a work vehicle and a frame of the work vehicle, the cab mounting assembly comprising:
a first mount configured to couple to the operator cabin of the work vehicle and comprising a first plate; and
a second mount configured to couple to the frame and comprising a second plate configured to couple to the first plate;
wherein the first plate comprises a first vertically-facing surface and the second plate comprises a second vertically-facing surface, the first vertically-facing surface is configured to contact the second vertically-facing surface when the first plate and the second plate are coupled to one another, and a portion of the first vertically-facing surface is configured to separate from the second vertically-facing surface to absorb energy during a roll-over event,
wherein the second plate comprises a third vertically-facing surface that is configured to contact the frame when the second mount is coupled to the frame.

2. The cab mounting assembly of claim 1, wherein the first mount comprises a pin to support a strap that couples the first mount to the operator cabin.

3. The cab mounting assembly of claim 1, wherein the cab mounting assembly is configured to be positioned laterally inward of a wheel or a track that carries the work vehicle across a field.

4. The cab mounting assembly of claim 1, wherein the cab mounting assembly is configured to be positioned vertically below an operator seat within the operator cab as the work vehicle travels across a field.

5. The cab mounting assembly of claim 1, wherein the cab mounting assembly is configured to be positioned rearward of the operator seat relative to a direction of travel of the work vehicle.

6. The cab mounting assembly of claim 1, wherein at least one plate is configured to deform to cause the portion of the first vertically-facing surface to separate from the second vertically-facing surface to absorb the energy during the roll-over.

7. The cab mounting assembly of claim 1, wherein the cab mounting assembly is configured to support the frame when the work vehicle is in an inverted position with the frame vertically above the cab mounting assembly and the operator cabin.

8. The cab mounting assembly of claim 1, wherein the first plate and the second plate each comprise multiple openings configured to receive fasteners to couple the first plate and the second plate to one another.

9. The cab mounting assembly of claim 1, wherein an interface between the first vertically-facing surface and the second vertically-facing surface is located at a first height from a bottom end of the cab mounting assembly that is approximately equal to or less than 50 percent of a total height of the cab mounting assembly.

10. The cab mounting assembly of claim 1, wherein a length of the cab mounting assembly in a longitudinal direction decreases from a bottom end to a top end of the cab mounting assembly.

11. The cab mounting assembly of claim 1, wherein the frame supports a transmission of the work vehicle.

12. The cab mounting assembly of claim 1, comprising a suspension assembly coupled to the first mount or the second mount and configured to couple to the operator cabin.

13. A cab mounting assembly for a work vehicle, comprising:
a first mount configured to couple to an operator cabin of the work vehicle; and
a second mount configured to couple to a frame of the work vehicle and to the first mount;

wherein the first mount comprises a first vertically-facing surface and the second mount comprises a second vertically-facing surface, the first vertically-facing surface is configured to contact the second-vertically facing surface at an interface when the first mount and the second mount are coupled to one another, and at least one of the first mount and the second mount are configured to deform proximate to the interface when under tension during a roll-over event, wherein the second mount comprises a third vertically-facing surface that is configured to contact a fourth-vertically facing surface of the frame to facilitate coupling the second mount to the frame.

14. The cab mounting assembly of claim 13, wherein the cab mounting assembly is configured to be positioned laterally inward of a wheel or a track that carries the work vehicle across a field.

15. The cab mounting assembly of claim 13, wherein the cab mounting assembly is configured to be positioned vertically below and rearward of an operator seat within the operator cab as the work vehicle travels across a field.

16. The cab mounting assembly of claim 13, wherein the interface is located a first height from a bottom end of the cab mounting assembly that is approximately equal to or less than 50 percent of a total height of the cab mounting assembly.

17. The cab mounting assembly of claim 13, wherein the frame supports a transmission of the work vehicle.

18. A work vehicle, comprising:
an operator cabin;
a transmission-supporting frame;
a mounting assembly, comprising:
  a first mount configured to couple to the operator cabin; and
  a second mount configured to couple to the transmission-supporting frame;
  wherein the first mount comprises a first plate and the second mount comprises a second plate, the first plate and the second plate are coupled to one another at an interface, and at least one of the first plate and the second plate are configured to deform proximate to the interface to separate from one another when under tension during a roll-over event, wherein the second plate comprises a vertically-facing surface that is configured to contact the transmission-supporting frame.

* * * * *